United States Patent [19]
Anderson

[11] 3,849,306
[45] Nov. 19, 1974

[54] PROCESS AND APPARATUS FOR REMOVING IMPURITIES FROM CONDENSATE WATER

[75] Inventor: John R. Anderson, Cranbury, N.J.

[73] Assignee: The Permutit Company, Inc., Paramus, N.J.

[22] Filed: June 5, 1973

[21] Appl. No.: 367,141

Related U.S. Application Data

[63] Continuation-in-part of Ser. No. 209,160, Dec. 17, 1971, abandoned, which is a continuation-in-part of Ser. No. 25,160, April 2, 1970, abandoned.

[52] U.S. Cl.................. 210/38, 210/264, 210/284
[51] Int. Cl. ........................... B01j 1/08, C02b 1/68
[58] Field of Search ........ 210/32, 37, 38, 264, 284, 210/290

[56] References Cited
UNITED STATES PATENTS

| 3,250,703 | 5/1966 | Levendusky | 210/37 X |
| 3,414,508 | 12/1968 | Applebaum et al. | 210/37 X |
| 3,497,069 | 2/1970 | Lindenthal et al. | 210/37 X |
| 3,537,989 | 11/1970 | Crits | 210/32 |
| 3,583,908 | 6/1971 | Crits | 210/32 |
| 3,585,127 | 6/1971 | Salem | 210/32 |

Primary Examiner—Thomas G. Wyse
Attorney, Agent, or Firm—Theodore B. Roessel; James A. Rich

[57] ABSTRACT

Condensate water containing ammonia is filtered and demineralized in a first bed containing strong acid cation exchange resin, preferably having an effective particle size on the order of 0.30 mm, followed by treatment in a second strong base anion exchange resin, and final treatment in a third bed containing strong acid cation exchange resin. Leakage of solid forming ions is nil and regeneration problems encountered in mixed beds are avoided.

7 Claims, 1 Drawing Figure 3,849,306
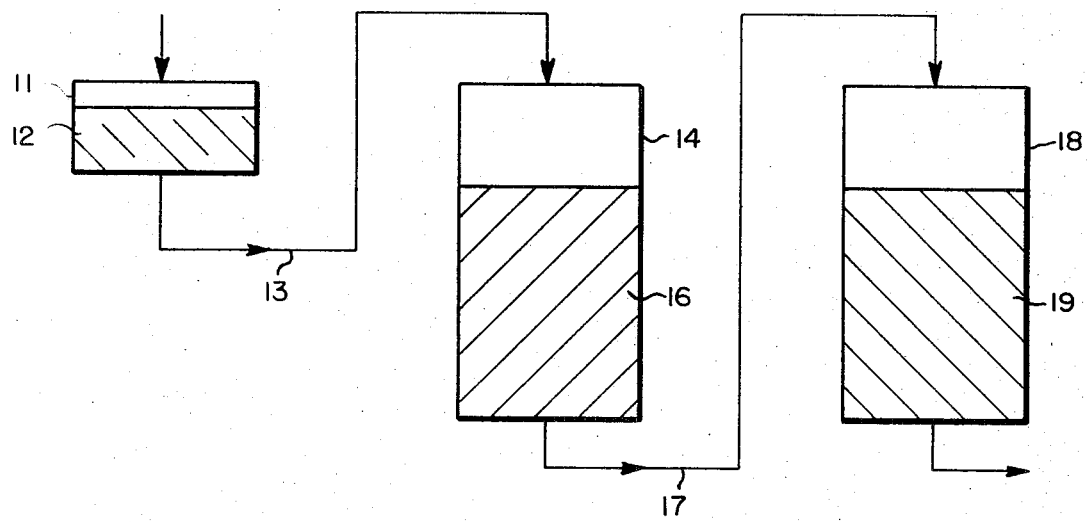
INVENTOR.
JOHN R. ANDERSON
BY
ATTORNEY

PROCESS AND APPARATUS FOR REMOVING IMPURITIES FROM CONDENSATE WATER

RELATED APPLICATION

This application is a continuation-in-part of application Ser. No. 209,160 filed Dec. 17, 1971, now abandoned which was a continuation-in-part of application Ser. No. 25,160 filed Apr. 2, 1970 and now abandoned.

FIELD OF THE INVENTION

This invention relates to a process for removing impurities from water and most specifically, to a process for filtering and demineralizing condensate from a supercritical steam cycle when said water contains ammonia.

BACKGROUND OF THE INVENTION

In the treatment of water for use and reuse in a supercritical steam cycle in the electric power industry, it is essential that such water be filtered in order to remove any undissolved solids and additionally be demineralized in order to remove any solid forming precursor ions such as sodium, the presence of which would cause the formation of undesirable coatings and solid deposits within the boiler-turbine system.

Even though the condensate water from such a system is normally recirculated in a closed loop, there is a contamination of such water by solid forming precursor ions due to the addition of make up water, the corrosion of metals in the system, or leakage of untreated condensor water into the system. Additionally, there is a contamination of insoluble material often referred to in the power industry as "crud" which consists of metallic oxides, hydroxides, and so forth.

To minimize corrosion of carbon steel the pH of such water is elevated with ammonia to a value of about pH 9.2 to pH 9.7.

It has long been recognized in the demineralization processing of water that the use of separate beds of anion and cation exchange resins in series do not provide as effective demineralization of water as do mixed bed demineralizers containing in a single bed an admixture of anion and cation resins. It is particularly important in the treatment of condensate water that demineralization be as effective and complete as possible since inclusion of very minor amounts of impurities in the condensate water can cause deposits of solids to build up within the system thereby adversely affecting the heat transfer characteristics of the equipment and causing a loss of system efficiency and even an increase in the frequency of costly shut-downs.

For the aforementioned reasons, the mixed bed systems were developed. Mixed bed systems, however, can be very difficult to regenerate. Care must be exercised in the separation of the cation and anion resins prior to regeneration in order to insure that anion exchange resin regenerate solution does not contact the cation exchange resin. As normally practiced, the regeneration of anion exchange resin is effected by contacting exhausted resin with an alkali regenerate solution such as an aqueous solution of sodium hydroxide. As may be expected, should the anion resin regenerant contact the cation exchange resin the sodium ion will replace the cation on the resin at the time thereby placing the cation resin in the sodium form. When placed back in service, the ammonium ions of the condensate water will replace the sodium ions causing the sodium ions to leak into the finished condensate water. Sodium ion leakage is most undesirable since sodium ions are solid forming precursor ions.

Complete separation of the anion and cation resin of a mixed bed is substantially impossible and normally the anion resin will contain a small amount of entrained cation resin which, as a result of the anion resin regeneration, is put into the alkali cation form. During the subsequent operation of the mixed bed system, the ammonium ions of the condensate water will replace the alkali cations of the entrained cation resin eventually leading to leakage of these solid forming precursor cations into the condensate water going to service as explained above.

This problem has been recognized in the prior art and numerous attempts to solve solid forming precursor ion leakage due to inefficient resin regeneration have been made.

Crits and Zahn in U.S. Pat. No. 3,385,787 have claimed a special regeneration method for mixed bed condensate demineralizers to overcome the problem of being unable to separate the resins adequately, and later Applebaum and Crits in U.S. Pat. No. 3,414,508 claimed another special regeneration method including ammonation of the mixed bed after regeneration for elimination of sodium ion or any entrained cation resin. Calmon in U.S. Pat. No. 3,501,401 claims still another regeneration method employing a lime wash of the anion resin portion of the mixed bed. Finally Crits in U.S. Pat. No. 3,531,401 and U.S. Pat. No. 3,583,908 claims still other special regeneration methods for mixed bed condensate demineralizers to overcome the problem of sodium ion leakage which is primarily due to the difficulty of separating a bed of mixed resins adequately before the separated resins are regenerated.

Another important aspect of condensate water treatment is the removal of undissolved solids which are present in condensate water due to the normal accumulation of insoluble metal hydroxides, contamination and the like. Such undissolved solids are removed by filtration, which conventionally constitutes a separate step in the condensate water treatment process. The incorporation in the condensate treatment process of a separate filtering operation clearly increases the costs of operation since the condensate water must be subjected to a separate filtering step through expensive filtering equipment.

Levendusky in U.S. Pat. No. 3,250,703 teaches a method for removing the soluble and insoluble impurities from condensate water in a single step utilizing a filter screen composed of mixed cation and anion resin of small (about 60 to about 400) mesh USS resin. The use of thin beds of finely divided (60–400 mesh) mixed anion and cation exchange resins to filter and demineralize simultaneously provides satisfactory treatment for normal operation but does not provide sufficient ion exchange capacity in reserve in the event of contamination of the condensate water by untreated cooling water. Thin beds of this type are also deficient during startup of demineralization systems when both ionic and insoluble impurities are in high concentration; and thin beds of fine resin can be regenerated only with great difficulty, so much so that the resin is normally disposed of after its exchange capacity or filtering ability is once exhausted.

Accordingly, it is an object of this invention to provide an improved method for removing undissolved and dissolved impurities from condensate water that contains ammonia while at the same time providing sufficient filtering capacity and ion exchange capacity in reserve in the event water containing solid forming precursor ions and inordinate proportions of "crud" contaminate the condensate water system.

Another object of the invention is to provide a method for filtering and demineralizing condensate water that contains ammonia without the use of mixed beds.

These and other objects and advantages of this invention will become apparent upon consideration of the following detailed description and the drawing, and the novel features thereof for this specific application in the power industry, will be particularly pointed out hereinafter in connection with the appended claims.

BRIEF DESCRIPTION OF THE DRAWINGS

The FIGURE is a schematic layout in flow diagram of a three vessel system in accordance with this invention.

SUMMARY OF THE INVENTION

I have found that unexpectedly good results are obtained when condensate water containing ammonia is treated with separate beds in accordance with my invention.

According to the present invention, I pass water to be treated through a first bed consisting essentially of a strong acid cation exchange resin in the hydrogen or ammonium form where removal of undissolved solids and substantial, but not necessarily entire, removal of cations takes place, then through a second bed, comprising strong base anion exchange resin in the hydroxide form where anions are essentially all removed and finally through a third bed consisting essentially of strong acid cation exchange resin in the hydrogen or ammonium form where any cations which may have passed through or leaked from said first bed, are removed.

DESCRIPTION OF THE INVENTION

The cation exchange resin particles of the first bed preferably have a particle size on the order of about 35 to about 60 mesh USS series and an effective particle size of the order of about 0.30 mm. The first bed serves both as a filter for removing solid contaminants from water being treated and as an ion exchanger for removing a substantial proportion of cations from condensate water. Effective particle size as used herein is determined by the size of the screen opening through which 90% of the particles being sized will pass.

In some cases this first bed may exchange substantially all cations present in the condensate for ammonium or hydrogen ions. I prefer that the cation resin be in the ammonium form since condensate water is normally treated with ammonium hydroxide to a pH of between about 9 to about 10 to reduce the corrosive effects therefor and the exchange activity does not thereby decrease the ammonium ion content of the condensate water.

The condensate water is then passed through a bed of strong base anion exhange resin and afterwards through a bed of cation exchange resin, also preferably in the ammonium form. Solid forming precursor cations, such a sodium, which pass through or leak from the preliminary demineralization cation bed are removed by the subsequent cation exchange resin bed resulting in a polished condensate water substantially free of solid forming presursor ions as well as undissolved solids. In addition, the subsequent cation exchange bed acts as a backup or reserve in the event the proportion of solid forming precursor cations contained in the condensate water exceed the exchange capacity of the resin in the first bed due to leakage of untreated cooling water into the condensate system or due to the aforementioned high ionic loadings characteristic of startup operations.

It should be understood that in order to maintain the pH of the water in the preferred range from about pH 9.2 to about pH 9.7 on the order of 1,000 to 2,000 parts per billion of free ammonia needs to be present in the water. In contrast, condensate water normally contains on the order of only 10 parts per billion or less, and rarely exceeds 100 parts per billion of other total dissolved impurities. Thus, the ammonia concentrations of normal condensate water far exceeds the concentrations of the other dissolved impurities in normal condensate water.

Referring to the FIGURE condensate water to be treated in accordance with this invention is passed through a first vessel 11 containing a bed of strong acid cation exchange resin 12 where undissolved solids are filtered from said water and a preliminary exchange of cations occurs. Following treatment in first bed 12, water flows by means of line 13 to second vessel 14 containing bed 16 which consists of a strong base anion exchange resin. Removal of anion impurities in the water occurs while the water is passing through 16. Line 17 carries the water from second vessel 14 to third vessel 18 containing bed 19 consisting of a strong acid cation exchange resin. The remaining solid forming precursor cations are exchanged by the resin of bed 19. After passing through bed 19, the water is led to service.

In the preferred embodiment of this invention, bed 12 is substantially shallower than either bed 16 or 19 and the effective particle size of the cation resin thereof is finer, i.e., about 0.30 mm as contrasted to the effective particle size of the resins of bed 16 and 19 which are of conventional size, i.e., on the order of about 0.4–0.6 mm. The finer size of the resin particles of bed 12 aids in the filtering effect thereof while at the same time the particle size is not so fine that after removal from vessel 11 a backwashing and regeneration of bed 12 is rendered uneconomical. An advantage to maintaining bed 12 as a shallow bed lies in the fact that in operation, backwashing and regeneration thereof will be required at more frequent intervals than would be required for bed 16 or bed 19 due to the buildup of undissolved solids therein. It is contemplated that under normal operation, the buildup of solids will require backwashing of bed 12 prior to its reaching its cation exchange capacity for alkali metal cations and akaline earth metal cations. Accordingly, if a conventional depth bed were to be used in vessel 11, the exchange capacity of the cation resin contained therein would hardly ever be reached and in operation, large amounts of unexhausted resin would be required to be backwashed and regenerated. Accordingly, the shallow bed is found to be more economical. It should be pointed out, however, that if desired, bed 12 can be of conventional depth and of conventional particle size although filter efficiency will be descreased and best economy of operation will not be achieved.

The cation exchange resin used in beds 12 and 19 are conventional strong acid cation exchange resins. The cation resin is preferably in the ammonium form although for reasons hereinafter stated, under certain be it may b preferred to have the cation exchange resin in one or both of the cation beds in the hydrogen form. The anion resin used in accordance with this invention is a conventional strong base type anionic resin in the hydroxide form. Resins in each bed type are regenerated by conventional regeneration techniques.

As mentioned above, it is preferred that the first bed be relatively shallow in comparison to the second and third beds which conventionally are so-called deep beds ranging in depth normally on the order of about 24 to about 40 inches. The shallowness of the first bed is largely dependent on the solids content of the water being treated, it being contemplated that for normal conditions of power plant operation the first bed thickness should be on the order of several inches, preferably between about 3 and about 10 inches. However, if it is contemplated that the solids content of the water being treated is very high, such as when a new plate is first put into operation, or when there has been a prolonged shutdown, then the thickness of the frist bed can be increased thereby increasing the cation exchange capacity thereof. Under normal operating conditions the first bed may require periodic backwashing, primarily due to the buildup of solids in the bed. Regeneration of the first bed will also be required more frequently than with the other beds of the system due to the lesser amount of resin forming the bed and to the higher cation content of the water being treated, as contrasted to the water passing through the other cation bed, because such water has already been subjected to a nearly complete demineralization in the first and second bed. The second bed will require regeneration on a schedule depending on the anion content of the water being treated. The third bed will require regeneration only infrequently since its primary purpose is to supply a final polishing step, that is to remove any cations which have passed through the system to that point. Since condensate water normally has a very low concentration of solid forming precursor cations and anions, the second and third beds will be able to be maintained on stream for relatively long periods of time thereby eliminating the necessity of frequent regenerations of large volumes of resin. It will also be seen that leakage of solid forming precursor cations is substantially eliminated by the method of this invention and that a large ion removal reserve is afforded by virtue of the series arrangement of the beds which have the ability to remove large amounts of anions and cations from the condensate water. This feature allows for the operation of the plant even during emergencies such as the gross contamination of the condensate water due to the leakage of untreated cooling water into condensate water.

Although, as mentioned above, it is preferred to have the cation exchange resins of the first and third beds in the ammonium form, under certain circumstances, such as when the condensate water is heavily loaded with alkali metal cations and alkaline earth metal cations, it may be desirable to have the cation resin of the first or both cation beds in the hydrogen form. In the case where the first cation bed or both cation beds are in the hydrogen from, provision may be made for reammoniating the condensate water after preliminary demineralization in the first bed or after passing through the third bed in order to maintain the ammonium content and pH of the condensate at the proper level.

EXAMPLE 1

To demonstrate the efficiency of the separate bed system of this invention, three one inch diameter glass columns were connected in series in the manner shown the FIGURE. The first column contained a bed 9 inches deep of a strong acid cation resin, identified as "Permutit QB" resin, in the ammonia form, having a particle size range of from about 35 to about 60 mesh USS and an effective particle size of about 0.30 mm. The second column contained a bed 24 inches deep of a strong base anion exchange resin, (identified as "Permutit S-1" resin) in the hydroxide form. The third column contained 24 inches of the same type of strong acid cation resin as the first column, also in the ammonia form. The resin contained in the second and third columns was in the commercially available form insofar as particle size was concerned and thus had a particle size of 20 to 50 mesh USS.

Water made to simulate condensate water and containing 2,000 ppb ammonia and having a sodium ion concentration of 26 ppb was passed through the system at a flowrate of 24 gallons per minute per square foot of resin surface.

Effluent water from the last column was sampled after about 1½ hours of operation, tested for sodium ion leakage on a Jarrell Ash fully compensated Atomic Absorbtion Spectrometer at 589.3 nanometers wave length and found to have an average sodium ion concentration of less than 1 ppb.

EXAMPLE 2

In order to test the efficiency of the three bed system of this invention under extradordinary conditions, condensate water having an ammonia content of 2,000 parts per billion and a sodium ion concentration of 4,500 parts per billion was passed through the three bed system of Example 1. In the first run the first and third beds of the system were in the hydrogen form. In the second run, the first and third beds were in the ammonium form and in the third run the first bed was in the hydrogen form and the third bed was in the ammonium form. The second bed was in the hydroxide form in all runs.

The effluent was sampled every 30 minutes over a 2 hour period and the sodium ion concentration tested as in Example 1.

The results were as follows:

| | |
|---|---|
| Run 1 | less than 1 ppb sodium in effluent |
| Run 2 | 1-5 ppb sodium in effluent |
| Run 3 | less than 1 ppb sodium in effluent. |

EXAMPLE 3

In order to test the efficacy of the first bed as a filter, a run was carried out in a commercial power plant using actual condensate water. The condensate water contained an extremely low concentration of undissolved solids, so little, in fact, that the solids could not be detected under the standard test conditions usually employed in power plants where one liter of condensate water is filtered through a 0.45 micron Millipore filter and the filter examined for staining. The resin bed contained 0.75 cubic feet of the strong acid cation resin of Example 1 with a resin depth of 10 inches. The resin was finely divided having a particle size of between about 35 and about 60 mesh USS. The resin was in the ammonium form. The bed container was provided with a sight glass so that condition of the bed could be observed. After 45 days of operation, filtered solids had not yet broken through the bed, and the resin was found to contain 56 grams of iron per cubic foot and 15 grams of copper per cubic foot. As the total volume of water treated was 3,750,000 gallons per cubic foot, this is equivalent to removing 4 parts per billion of iron and 1.1 parts per billion of copper from the condensate per cubic foot of resin showing the filtering capability of the resin bed.

From the foregoing description, it is readily apparent how the present invention accomplishes its various objectives. While the invention has been described and illustrated herewith, with references to certain preferred embodiments thereof, it is to be understood that it may be otherwise embodied within the scope of the appended claims.

I claim:

1. A process for removing impurities from condensate water containing sodium ions and ammonia consisting essentially of passing said water in series through a first vessel containing a first bed consisting essentially of particulate strong acid cation exchange resin in the hydrogen or ammonium form, passing said water through a second vessel containing a second bed consisting essentially of particulate strong base anion exchange resin in the hydroxide form and finally passing said water through a third vessel containing a third bed consisting essentially of particulate strong acid cation exchange resin in the hydrogen or ammonium form.

2. The process of claim 1 wherein said resin of said first bed has an effective particle size less than the effective particle size of the resins used in said second and third beds.

3. The process of claim 1 wherein the effective particle size of the resin of said first bed is on the order of about 0.30 mm.

4. The process of claim 1 wherein said condensate water is maintained at a pH of between about 9 and about 10 by the addition of ammonium hydroxide.

5. In combination, apparatus for treating condensate water containing sodium ions and ammonium hydroxide consisting essentially of, in series, a first vessel having a service inlet and a service outlet and containing a first bed of particulate strong acid cation exchange resin in the hydrogen or ammonium form, said resin having an average particle size of between about 35 and about 60 Mesh U.S.S. series and an effective particle size of about 0.30 mm, a second vessel having a service inlet and a service outlet and containing a second bed of particulate anion exchange resin in the hydroxide form and a third vessel having a service inlet and a service outlet and containing a third bed of particulate cation exchange resin in the hydrogen or ammonium form, the effective particle size of the said resins of said second and third beds being between about 0.4 and about 0.6 mm, means for connecting the service outlet of the first vessel to the service inlet of the second vessel, means for connecting the service outlet of the second vessel to the service inlet of the third vessel, and means for supplying water to be treated to the service inlet of the first vessel, whereby said water passes sequentially through said first, second and third resin beds and undissolved solids and solid forming precursor cation ions are substantially removed from said water and leakage of solid forming precursor ions into said water is substantially prevented.

6. A process according to claim 1 wherein the cation exchange resin in the first vessel and the cation exchange resin in the third vessel are in the ammonium form.

7. Apparatus according to claim 5 wherein the cation exchange resin in the first vessel and the cation exchange resin in the third vessel are in the ammonium form.

* * * * *